United States Patent [19]

Allen

[11] 4,367,785

[45] Jan. 11, 1983

[54] LIQUID CIRCULATION METHOD AND APPARATUS

[75] Inventor: Paul E. Allen, Newtown, Conn.

[73] Assignee: Logic Devices, Inc., Bethel, Conn.

[21] Appl. No.: 232,467

[22] Filed: Feb. 9, 1981

[51] Int. Cl.³ .............................................. F28F 27/00
[52] U.S. Cl. ................................................ 165/2; 137/14;
137/334; 137/563; 137/593; 165/35; 165/40;
165/70; 165/104.31; 249/79
[58] Field of Search ................. 137/14, 334, 563, 593;
165/2, 35, 40, 70, 100, 104.31; 249/79

[56] References Cited

U.S. PATENT DOCUMENTS 4,151,243  4/1979  Allen ................................. 249/79 X Primary Examiner—Gerald A. Michalsky
Attorney, Agent, or Firm—Thomas L. Tully

[57] ABSTRACT

Method and apparatus for providing a controlled pressure liquid circulation system comprising a circulation conduit through which a liquid can be circulated and recirculated to accomplish a desired function, such as heating and/or cooling of a work station such as a mold. The invention involves opening and closing said circulation conduit to a source of supply liquid, such as city water, at elevated pressure while maintaining the controlled pressure of the liquid within said circulation conduit at a substantially lower pressure, and is characterized by maintaining the circulation conduit open to a drain line at all times and providing or maintaining a drain pressure which is at least slightly above atmospheric and is equal to the pressure desired within the circulation conduit in the area thereof which is open to the drain.

27 Claims, 2 Drawing Figures

LIQUID CIRCULATION METHOD AND APPARATUS

BACKGROUND OF THE INVENTION

The present invention relates to liquid circulation systems in which a liquid is circulated, usually at low pressure or negative pressure through a work station such as a mold in order to accomplish a function, such as the heating and/or cooling of the work station. In such systems it is desirable to control the pressure of the liquid in order to prevent failure of any weakened element in the system, such as rupture of hoses or seals and leakage of the liquid from the system, such as from small cracks which may be present in the work station or mold.

Liquid circulation systems, such as for mold heating, most commonly are provided with a supply line through which fresh liquid is introduced to the system, such as cool or cold water under pressure from a city supply conduit in order to supply liquid to the system and, when required, to lower the temperature of the circulating liquid, and with a drain line through which used or hot liquid can be emptied from the system. In prior-known systems it is known to employ a pressure regulator to control the pressure of the liquid entering the circulation system which includes the main circulation pump, and a supply bypass in advance of the regulator through which some of the supply liquid can be circulated by a second pump to a vent tank or reservoir. A third pump is required to pump the liquid from the reservoir back into the circulation system or out of a drain line which is normally closed but is opened when the system is to be cooled, in order to permit cold supply liquid to enter the circulation system. In such systems the circulation conduit is open at all times to the supply line and, therefore, the pressure of the supply liquid becomes the lowest pressure in the system, which pressure is increased even further by the action of the pump. When the heating cycle is completed, the drain line is opened to dump or circulate the hot liquid out of the drain and to permit cold supply liquid to enter from the supply line. This causes substantial variations in the pressure of the liquid within the system which necessitates the use of pressure check valves and safety valves in the system. These pressure variations are due to the facts that the supply liquid of city water is at an elevated pressure, i.e., about 50 psi to 80 psi, and the system is open to said pressure during circulation. Then the pressure within the circulation system drops down to the drain pressure, which may be 0 psi, during the draining cycle. Thus the system may undergo a pressure variation between about 0 psi and 80 psi, or more, which can cause failure of any weak element in the system, such as rupture of rubber hoses or seals and/or damage or leakage of the work station or mold.

In another known system which employs a single pump, the circulation water is pumped to a supply tank or reservoir located on a plane below the level of the mold and is sucked back up to and through the mold at sub-atmospheric pressure. The water pressure through the mold cannot be increased and, therefore, the rate of liquid circulation cannot be controlled at increased rates.

SUMMARY OF THE INVENTION

The present invention relates to a novel method and apparatus for maintaining a controllable, substantially uniform liquid pressure within a liquid circulation system provided with a liquid supply line and a drain line during the various cycles of operation of said system without the necessity of using secondary pumps, check valves and liquid reservoirs. This is accomplished by maintaining the liquid circulation system in the area of the liquid supply line open to the drain line at all times, and maintaining a desired drain pressure equal to the minimum pressure desired within the liquid circulation system while the latter is operating, whether said liquid circulation system is open or closed to the supply line. In effect, the present method and apparatus provides a liquid circulation system which is open to a drain line at all times in order to maintain a desired pressure in the circulation conduit in the area of the supply line and to prevent the build-up of pressure within the circulation conduit which is substantially greater than the drain pressure. A constant drain pressure is maintained even when the circulating liquid is not being drained.

According to a preferred embodiment, the present invention relates to such a method and apparatus incorporating a low pressure or negative pressure liquid circulation system of the type disclosed and claimed in co-pending U.S. application, Ser. No. 733,812, filed Oct. 19, 1976, now U.S. Pat. No. 4,278,230, the disclosure of which is incorporated herein by reference, such system being commercially-available under the trademark Logic Seal from Logic Devices, Inc., Bethel, Conn. In such system the liquid pressure is maintained at or slightly above atmospheric pressure in advance of the mold circulation conduit by means of an adjustable pressure regulator and is sucked through the mold at full flow by means of a positive displacement pump in order to achieve maximum heating even though the liquid pressure may be negative within the mold circulation conduit.

The novel system of the present invention comprises a circulation conduit through which a liquid is adapted to be recirculated for purposes of uniformly heating a work station comprising an element of said conduit, a liquid supply conduit opening into the circulation conduit for purposes of introducing a supply of pressurized city water, and a valve on said supply conduit for turning on said supply when the system is initially filled and thereafter, as required, to reduce the temperature of the circulating liquid. The circulation conduit is also provided with a drain conduit in the area of the liquid supply conduit, which drain conduit is open to a pressurized or non-pressurized drain at all times, the drain conduit being provided with a pressure-relief valve, preferably adjustable, if the drain has a pressure less than desired. In such case, the drain conduit is directly connected to a liquid supply conduit which is open at all times while the liquid circulation system is in operation in order to provide a controlled or regulated flow of supply liquid to said drain line to maintain a desired drain pressure equal to the pressure desired for the liquid within the circulation conduit.

THE DRAWINGS

Figure 1:
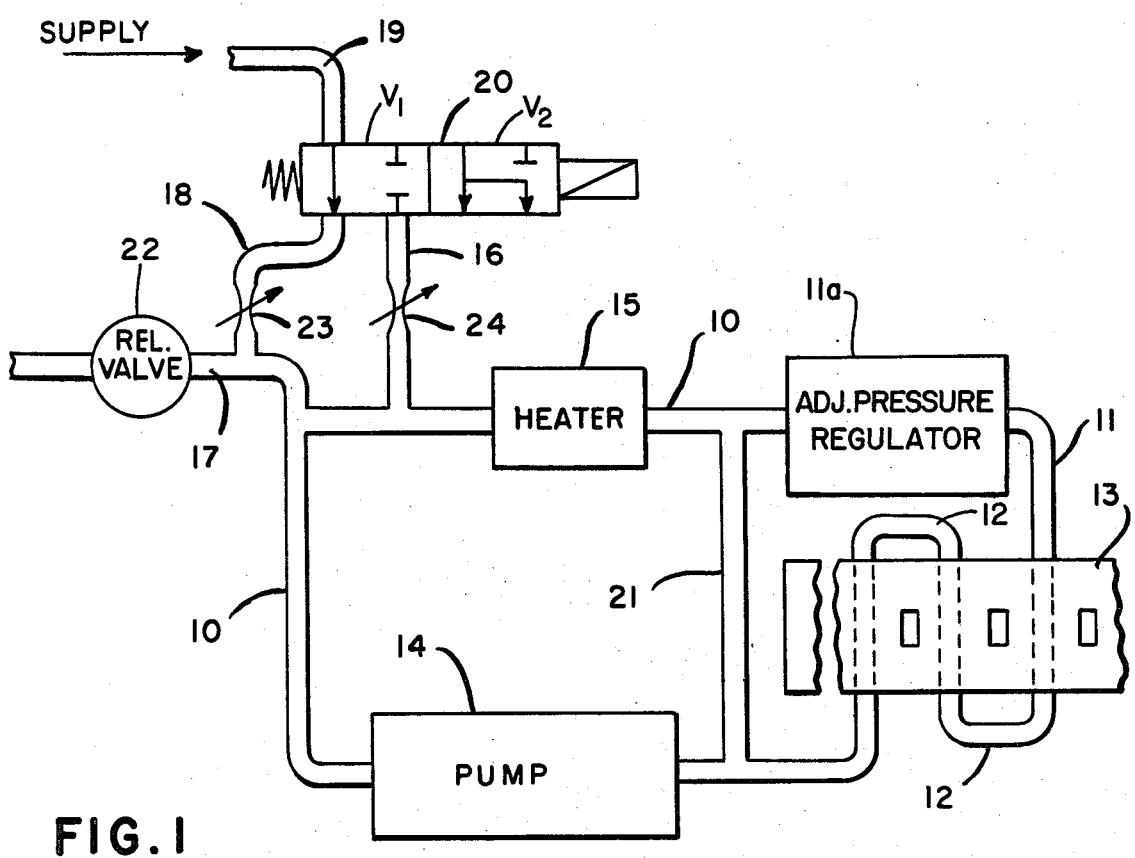
FIG. 1 is a block and schematic diagram of a system and apparatus according to one embodiment of the present invention, in which the existing drain pressure is less than desired for the system.
Figure 2:
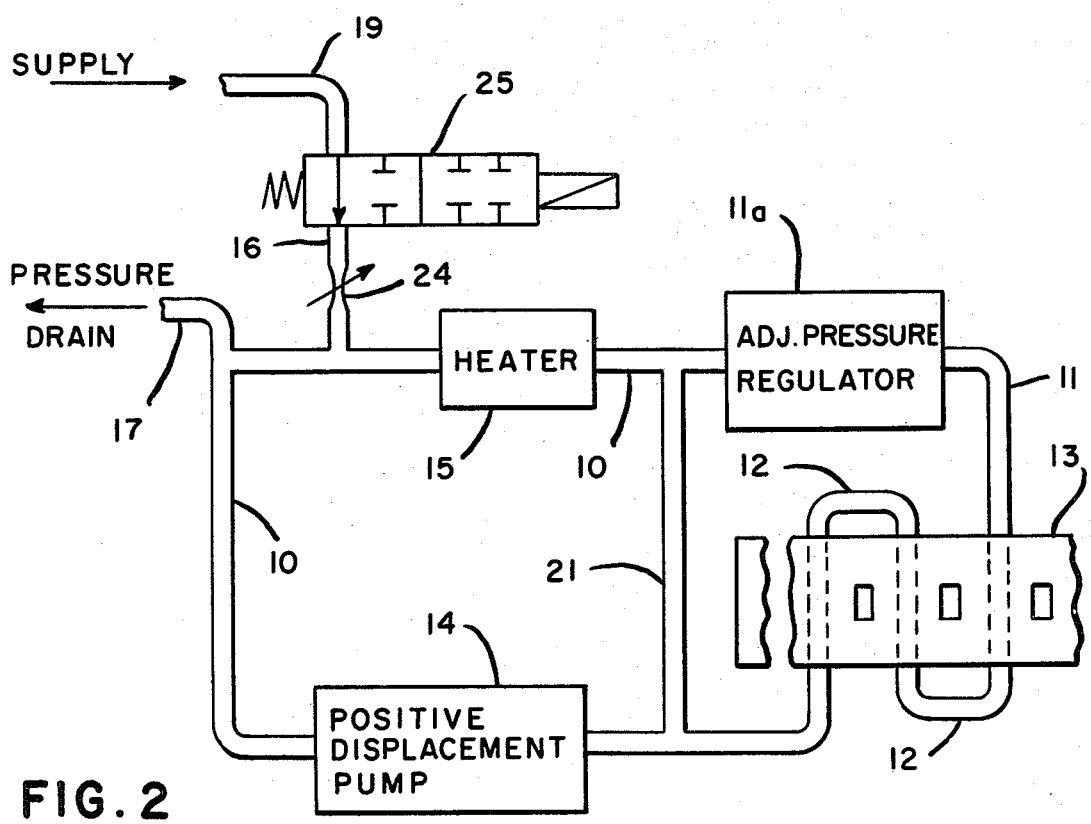
FIG. 2 is a block and schematic diagram of a system and apparatus according to another embodiment of the present invention in which the existing drain pressure is equal to the pressure desired with the circulation system.

Referring to the drawings the system of FIG. 1 is employed in situations where the existing or ambient drain pressure is atmospheric pressure, i.e., 0 psi gage, while the system of FIG. 2 is suitable in situations where the existing or ambient drain pressure is above atmospheric pressure. In the former case some means is required to develop and maintain a drain pressure greater than 0 psi, which pressure is required in the circulation conduit. In the latter case the ambient drain pressure will co-exist in the circulation conduit.

The embodiment of FIG. 1 comprises a circulation conduit 10 which communicates with a mold conduit segment 11 comprising a mold conduit 12 within an injection mold 13, a pump 14 and a heater 15.

The system illustrated is adapted to circulate water at any pressure above about atmospheric and up to 40 psi or more, as desired, without the need for a pressure regulator in the circulation conduit and without the possibility of said pressure substantially increasing when the circulation conduit is opened to a water supply, such as city water, at an elevated pressure of 60 psi or more.

As illustrated, the circulation conduit 10 communicates with a liquid supply conduit 16 and with a drain conduit 17, the latter also communicating with a liquid supply bypass conduit 18. The supply conduits 16 and 18 are connected to a city water supply conduit 19 through a three-way solenoid valve 20, the $V_1$ valve section being controlled for open position during all periods of operation of the pump 14 and circulation of water through the circulation conduit 10, and the $V_2$ valve section being controlled for open position only during periods when the system is initially filled with water and, thereafter, as required, to introduce cold water to lower the temperature of the hot circulation liquid and being controlled for closed position at all other times. The system of FIG. 1 also includes a preferred bypass circulation conduit 21 which communicates between the entrance of the mold conduit segment 11 and the entrance of the pump 14 to enlarge the capacity of the circulation conduit, to provide a constant flow to the pump and provide a shorter circulation path for a portion of the heated water. The large capacity of the circulation conduit provides a more uniform temperature and the bypass conduit 21 permits some of the water to recirculate more quickly back through the heater in order to maintain a uniform desired water temperature in the system.

It is also possible to provide the heater with a bypass conduit so that circulating water above a pre-determined temperature can bypass the heater 15 and flow more quickly back to the mold conduit 12.

FIG. 1 also illustrates an apparatus in which the drain conduit 17 is located on a plane higher than the circulation conduit 10 so that any air trapped within the conduit 10 will escape out the drain conduit as it seeks the highest point in the circulation conduit. This is a preferred embodiment in cases where a negative pressure is developed within the mold conduit 12 in order to draw air in through any cracks which may be present in the mold. Such air must be vented from the conduit 10 and this occurs automatically as the air is circulated with the water to the interface of the conduit 10 and the drain conduit 17. At said interface the air escapes upward into the drain conduit while the water continues to recirculate through the conduit 10 along its established flow pattern.

As illustrated, the liquid supply conduit 16 communicates with the circulation conduit 10 in an area between the heater 15 and the drain conduit 17 so that the admitted supply liquid is permitted unobstructed flow back out the drain conduit to relieve the pressure which otherwise would be imposed upon the circulation conduit 10 by the opening of the supply conduit 16 to the pressurized main supply conduit 19.

In the embodiment illustrated by FIG. 1, the drain conduit 17 is also provided with a pressure-relief valve 22 adapted to maintain a desired pressure to the drain, i.e., between about 1 psi and 40 psi. Most preferably, valve 22 is of the adjustable type, provided with a gage, so that it can be adjusted to any drain pressure desired by the user, including a low pressure between about 1 and 10 psi gage in cases where negative pressure is desired within the mold.

During the heating cycle the heater 15 is activated so that the water recirculating through the circulation conduit 10 is heated to the desired temperature to heat the mold 13. The $V_2$ valve section is closed to isolate the circulation conduit from the pressure of the supply line and to prevent cold supply water from entering the conduit 10, and the $V_1$ valve section is open to maintain the desired pressure at the drain so that a recirculation flow path is established for the hot water within the conduit 10 and no water passes between the conduit 10 and the drain conduit 17.

When the temperature of the water entering the mold section of the conduit 10 is higher than desired, as sensed by a temperature probe at the entrance of the mold conduit segment 11, the $V_2$ valve section is activated to open position to admit pressurized cold supply water through supply conduit 16 into the circulation conduit 10 at a location between the heater 15 and the drain conduit 17. Although the fresh supply water is introduced at a pressure of 50 psi or more, the water pressure is immediately relieved due to the fact that the excess supply water is able to flow back out the drain conduit through the pressure relief valve 22 which is open at pressures greater than desired, i.e., up to about 40 psi, as pre-set. Under these conditions no pressure substantially greater than the drain pressure is imposed upon any part of the circulation conduit 10.

When the cooling cycle is initiated, any excess cold water introduced causes the hot water to be drained from the circulation conduit 10 because the counter-clockwise flow or back-flow of the cooling supply water from supply conduit 16 out drain conduit 17 causes the hot water circulating in the circulation conduit 10 beyond the pump 14 to unite with the exiting supply water as it flows out the drain conduit 17. This back-flow continues during the entire water-cooling cycle, with only a portion of the new supply water from supply conduit 16 passing through the heater 15 and regulator at controlled pressure to the mold conduit 12 and the mold 13.

When the water-cooling cycle is completed, the $V_2$ valve section is activated to closed position in response to a signal from the temperature probe, causing the water present in the circulation conduit 10 beyond the pump 14 to re-circulate through the heater 15 and mold conduit segment 11, and to pass through the mold 13 and pump 14. During the conversion of the $V_2$ water supply valve from open to closed positions, the constant flow of supply water through the supply bypass conduit 18 and out the drain maintains the pre-determined desired pressure at the drain to prevent anymore water from flowing from the circulation conduit to the drain.

FIG. 1 also illustrates the presence of optional flow restrictors 23 and 24 in the water supply conduits 16 and 18, respectively. Such flow restrictors reduce the volume of water passing through conduits 16 and 18 in order to minimize waste and in order to reduce the rate at which supply water is introduced, thereby providing more uniform temperature regulation in conduit 10. Alternatively, a single flow restrictor may be used on the main supply conduit 19 in advance of the solenoid valve 20.

The present bypass supply conduit 18 is an essential element of the present system in cases where the existing drain pressure is zero or lower than desired since, in the absence thereof, water will flow out of the circulation conduit 10 into the drain or the desired water pressure in conduit 10 cannot be maintained. I have found that the use of a pressure-relief valve in a drain line to a drain having atmospheric pressure will not maintain an adequate pressure in the drain line in the absence of a supply bypass conduit, such as 18 of FIG. 1, since any such relief valve will leak under the effect of the unbalanced pressure on either side thereof, causing the lower drain pressure to draw water from the circulation conduit 10. This results in a reduction of the water pressure within the circulation conduit and an interference with the continuous water flow through said conduit.

The embodiment of FIG. 1 can be used in cases where a negative pressure is desired within the mold conduit 12, by providing a low or near-atmospheric pressure within the circulation conduit through the use of a relief valve 22 in the drain conduit 17 which is adjusted to maintain a drain pressure above about 0 psi and up to about 20 psi. In such cases the pump 14 is a positive displacement pump which sucks the water through the mold conduit 12, causing a pressure drop across the mold.

However, more preferably an adjustable pressure regulator 11a is used at the entrance of the mold conduit segment 11 in cases where a negative pressure is desired in the mold conduit 12 with a higher pressure existing in the circulation conduit. The regulator is adjusted to admit water to the mold conduit segment 11 at or slightly above atmospheric pressure and the positive displacement pump 14 sucks the water through the mold conduit 12 at sub-atmospheric pressure. Reference is again made to my co-pending U.S. application, Ser. No. 733,812, now U.S. Pat. No. 4,278,230.

FIG. 2 of the drawing illustrates a more simplified embodiment of the present invention which takes advantage of situations in which a constant, uniform drain pressure above about atmospheric pressure exists, i.e., an ambient drain pressure which is common in installations in which a drain pipe extends vertically for a distance of about 30 feet or more.

The system of FIG. 2 is identical to that of FIG. 1 except that no relief valve 22 is required in the drain conduit 17 and no supply bypass conduit 18 or valve section V₁ is required in order to develop and maintain a constant drain pressure. FIG. 2 also illustrates the presence of an adjustable pressure regulator 11a at the entrance of the mold conduit segment 11. Thus the elements of FIG. 2 are given the same reference numerals as the corresponding elements of FIG. 1 and the previous discussion of said elements and their functions with respect to FIG. 1 applies also to FIG. 2.

As with the apparatus of FIG. 1, the circulation conduit 10 of FIG. 2 is continuously open to the drain conduit 17 so that the ambient drain pressure, i.e., about 5-15 psi or more, becomes the pressure within the portion of the circulation conduit 10 which is open thereto. No pressure relief valve or supply bypass is required to develop and maintain a drain pressure because said pressure is pre-existent. During the heating cycle the supply water from main supply line 19 is turned off by means of a two-way solenoid valve 25 so that the circulation conduit 10 is isolated from the main water supply pressure.

When the water temperature is to be reduced, the valve 25 is activated to open position, as shown by FIG. 2, to supply water cold through supply conduit 16 and restrictor 24 but the pressure of the supply water is dissipated out by counterclockwise flow of excess supply water directly out the drain conduit 17 while a portion of the supply water passes through the heater 15, regulator 11a, mold conduit 12 and pump 14 and out the drain conduit 17, pushing the previously-heated water ahead of it and out the drain.

When the water-cooling cycle is completed, the supply valve 25 is activated to closed position. The pump 14 reestablishes a clockwise flow pattern of the water between the drain conduit 17 and the supply conduit 16, with no further water flowing into the drain conduit 17, since the drain pressure regains equilibrium with the water pressure within the adjacent area of the circulation conduit 10.

The system of FIG. 2 can also be used to provide a negative or sub-atmospheric pressure within the mold conduit 12 since the pressure within the circulation conduit 10 will normally be only slightly above atmospheric. Thus the regulator 11a and positive displacement pump 14 will produce a pressure drop below atmospheric in the mold conduit 12. In cases where sub-atmospheric pressure is not desired or required in the mold conduit 12, the regulator 11 may be omitted and the pump 14 need not be of the positive displacement type.

Variations and modifications will be apparent to those skilled in the art in the light of the present disclosure. For example, any means may be used to provide and maintain a drain pressure which is above 0 psi in order to use the system of FIG. 1 hereof. As stated hereinbefore, such means preferably is an adjustable pressure relief valve which can be preset by the user to any desired pressure between about 1 psi and 40 psi. The essential novelty resides in a system which is continuously open to a drain pressure which is sufficient for the continuous circulation of a liquid through a circulation conduit, and which communicates with a pressurized supply of liquid for the admission of supply liquid, as required, without imposing the pressure of said supply liquid upon the circulation conduit.

It should be understood that the present invention is not limited to the use of water as a pressurized supply liquid or to circulation systems which require the presence of a pressure regulator, a mold or a heater. Also, if the drain pressure is a satisfactory circulation pressure, i.e., above 0 psi, no pressure-relief valve is required since an equilibrium is created between the drain pressure and the circulation conduit. Also, it is possible to provide and maintain a negative pressure within the mold section 12 of the conduit 10 without the need for a regulator 11a by maintaining a pressure slightly above atmospheric in the drain conduit 17 and circulation conduit 10 since the positive displacement pump 14 will suck the water through the mold conduit 12 to cause a reduction in the pressure therewithin below atmospheric. As stated hereinbefore, this is advantageous in cases where the mold is cracked and will admit liquid having a pressure greater than atmospheric.

The pressure within the circulation conduit 10 adjacent the drain conduit 17 is fixed by the drain pressure. In the embodiment of FIG. 1 this pressure can be adjusted by the use of a pressure-relief valve 22 which is designed or can be regulated to open at any pre-determined gage pressure, i.e., 5 psi, 25 psi, or more, and then permitting an adequate flow of supply liquid through the supply bypass conduit 18 to satisfy the normal leakage of said valve 22 and prevent water from being drawn from the circulation conduit. In lieu of a pressure-relief valve 22, a head pressure may be established at the drain conduit 17, as is inherent in the systems illustrated by FIGS. 1 and 2. The head pressure is caused by the drain conduit being located on a vertical plane higher than the uppermost part of the circulation conduit. This differential may be varied to provide greater head pressures to accommodate the use of higher circulation pressures within conduit 10 without the need for a pressure-relief valve even when the ambient drain pressure is atmospheric.

The present circulation conduit can also include other elements depending upon the end use to which the system is to be put, such as pressure gauges, temperature probes and gauges, flow control valves, safety check valves and other elements as may be desirable for the operation of the system.

I claim:

1. A liquid circulation system which is adapted to be connected to a source of liquid at high pressure and to operate at a uniform controlled pressure lower than said high pressure, comprising a circulation conduit adapted to be filled with said liquid and comprising a pump means to circulate said liquid, a liquid supply conduit connected to said circulation conduit and adapted to be connected to a main liquid supply conduit containing a supply of liquid at high pressure to introduce said supply liquid to said circulation conduit, supply valve means on said liquid supply conduit adapted to open and close said main liquid supply to said circulation conduit, and a drain conduit connected to said circulation conduit and to a drain and having a drain pressure equal to the pressure desired for the liquid within said circulation conduit, whereby when said circulation conduit is filled with liquid and said supply valve is closed, the liquid flows through said circulation system at a controlled pressure equal to said drain pressure, and when said supply valve is opened, the high pressure of said supply liquid admitted to said circulation conduit is relieved by the free flow of a portion of liquid from said circulation conduit out of said drain conduit.

2. A liquid circulation system according to claim 1 in which said circulation conduit comprises a heating conduit of an injection mold.

3. A liquid circulation system according to claim 1 or claim 2 in which said circulation conduit comprises means for heating said liquid.

4. A liquid circulation system according to claim 2 in which said circulation conduit comprises a bypass conduit which increases the capacity of said circulation conduit and permits liquid to circulate back to the pump without passing through said conduit of said injection mold.

5. A liquid circulation system according to claim 1 in which said supply valve comprises a solenoid valve.

6. A liquid circulation system according to claim 1 which comprises means for maintaining the pressure of the liquid circulating through at least a segment of said circulation conduit to a pressure below atmospheric pressure.

7. A liquid circulation system according to claim 6 in which said means comprises a pressure-relief valve in said drain conduit which is adapted to maintain the drain pressure slightly above atmospheric, and a positive displacement pump which is adapted to reduce the pressure of the circulating liquid below atmospheric.

8. A liquid circulation system according to claim 6 in which said means comprises a pressure regulating means for reducing the pressure of the liquid within a segment of said circulation conduit.

9. A liquid circulation system according to claim 8 in which said means also comprises a positive displacement pump, and said pressure regulating means and said pump have a maximum capacity for fluid flow greater than the desired flow of the liquid through said segment of the circulation conduit whereby the liquid is sucked through said segment at sub-atmospheric pressure.

10. A liquid circulation system according to claim 1 in which said drain conduit is connected to said circulation conduit at the highest elevation thereof to permit the free release of air from the circulation liquid into said drain conduit.

11. A liquid circulation system which is adapted to be connected to a source of liquid at high pressure and to operate at a uniform controlled pressure lower than said high pressure, comprising a circulation conduit adapted to be filled with said liquid and comprising a pump means to circulate said liquid, a liquid supply conduit connected to said circulation conduit and adapted to be connected to a main liquid supply conduit containing a supply of liquid at high pressure to introduce said supply liquid to said circulation conduit, supply valve means on said liquid supply conduit adapted to open and close said main liquid supply to said circulation conduit, a drain conduit connected to said circulation conduit and adapted to be connected to a drain, pressure relief means in said drain conduit adapted to maintain a desired pressure in said drain conduit and in said circulation conduit, a liquid supply bypass conduit connected to said drain conduit and adapted to be connected to said main liquid supply conduit to admit a continuous flow of a portion of said supply liquid directly to said pressure relief means in said drain conduit to maintain a pressure in said drain conduit equal to the pressure desired for the liquid within said circulation conduit, whereby when said supply valve is closed, liquid flows through said circulation system at said desired controlled pressure, and when said supply valve is opened, the high pressure of said supply liquid admitted to said circulation conduit is relieved by the free flow of a substantial portion of said supply liquid out of said drain conduit.

12. A liquid circulation system according to claim 11 in which said pressure relief means comprises an adjustable pressure relief valve for pre-setting the desired pressure in said drain conduit.

13. A liquid circulation system according to claim 11 in which said supply valve comprises a unitary three-way solenoid valve which includes a bypass valve to said bypass conduit.

14. A liquid circulation system according to claim 11 which comprises means for reducing the pressure of the liquid circulating through a segment of said circulation conduit to a pressure below atmospheric pressure.

15. A liquid circulation system according to claim 14 in which said means comprises a pressure regulating means and a positive displacement pump, and said segment comprises a heating conduit of an injection mold.

16. A liquid circulation system according to claim 15 in which said pressure regulating means and said pump means have a maximum capacity for fluid flow greater than the desired flow of the liquid through a segment of said circulation conduit whereby the liquid is sucked through said segment at subatmospheric pressure.

17. A liquid circulation system according to claim 11 in which said pressure-relief means comprises a pressure-relief valve in said drain conduit to maintain the drain pressure above atmospheric.

18. A liquid circulation system according to claim 11 in which said circulation conduit includes a bypass conduit which increases the capacity of said circulation conduit and permits liquid to circulate back to the pump without passing through a segment of said circulation conduit.

19. A liquid circulation system which is adapted to be connected to a source of liquid at high pressure, comprising a circulation conduit adapted to be filled with said liquid and comprising a pump means to circulate said liquid, a pressure regulating means in said circulation conduit adapted to reduce the pressure of the liquid passing therethrough to a desired, controlled pressure, a liquid supply conduit connected to said circulation conduit at a location in advance of said pressure regulating means and adapted to be connected to a main liquid supply conduit containing a supply of liquid at high pressure to introduce said supply liquid to said circulation conduit, supply valve means on said liquid conduit adapted to open and close said main liquid supply to said circulation conduit, a drain conduit connected to said circulation conduit and comprising a pressure relief means adapted to maintain a desired pressure in said drain conduit and in said circulation conduit, a liquid supply bypass conduit connected to said drain conduit and adapted to be connected to said main liquid supply conduit to admit a continuous supply of a portion of said supply liquid directly to said drain conduit to maintain a drain pressure equal to the pressure desired for the liquid within said circulation conduit, said liquid supply conduit being connected to said circulation conduit at a location between said pressure regulating means and said drain conduit, whereby when said supply valve is closed, liquid flows through said circulation system at said desired controlled pressure, and when said supply valve is opened, the high pressure of said supply liquid admitted to said circulation conduit is relieved by the free flow of a portion of said liquid from said circulation conduit out of said drain conduit.

20. A method for controlling the pressure of a liquid circulated by a pump means within a liquid circulation conduit which is adapted to receive additional pressurized supply liquid, as required, from a pressurized main supply liquid source and is adapted to discharge said circulated liquid to a drain line having a drain pressure equal to the pressure desired within the circulation conduit, which comprises maintaining said liquid circulation system filled with liquid and open to said drain conduit at all times, opening said pressurized supply liquid source to said liquid circulation system to supply additional liquid, as required, to said circulation conduit, the pressure of the liquid which is permitted to circulate through said circulation conduit being reduced by the discharge of liquid from said circulation conduit out said drain line, and closing said pressurized supply liquid source to said circulation conduit while maintaining said circulation conduit open to said drain line in order to maintain an equilibrium between the pressure of the liquid within said circulation conduit and the pressure of the liquid in said drain line.

21. A method according to claim 20 which comprises controlling the pressure and temperature of the circulation liquid, said supply liquid comprising a cold liquid, which comprises heating said circulating liquid to a desired temperature to accomplish a function, sensing the temperature of said circulating liquid and opening said circulation conduit to said pressurized supply liquid source to admit cold supply liquid when the temperature of said circulating liquid exceeds the desired temperature.

22. A method according to claim 20 or claim 21 for controlling the pressure and temperature of a liquid which is circulated through a mold heating conduit comprising a segment of said circulation conduit for purposes of heating a mold.

23. A method according to claim 20 or claim 21 in which said supply liquid has a pressure substantially above about 30 psi and the drain pressure and the pressure of the liquid within said circulation conduit is maintained at a pressure substantially below about 30 psi.

24. A method according to claim 20 in which said drain line has an ambient drain pressure which is equal to the desired pressure within the circulation conduit.

25. A method according to claim 20 in which said drain line normally has an inadequate drain pressure but said drain line is provided with a pressure relief valve and fed a direct continuous supply of liquid from said pressurized supply liquid source to develop and maintain said desired drain pressure.

26. A method according to claim 20 in which said circulation conduit is maintained open to said drain line at the highest elevation thereof to permit the free release of air from the circulation liquid into the drain line.

27. A method according to claim 20 in which said drain line is located on a vertical plane above the highest elevation of said circulation conduit to establish a head pressure therebetween.

* * * * *